(12) United States Patent
Kulasingam et al.

(10) Patent No.: US 8,301,741 B2
(45) Date of Patent: Oct. 30, 2012

(54) CLONING POLICY USING TEMPLATES AND OVERRIDE CLONED POLICY

(75) Inventors: Katha Kulasingam, Kanata (CA); Sue Callow, Kanata (CA)

(73) Assignee: Alcatel Lucent, Paris (FR)

( * ) Notice: Subject to any disclaimer, the term of this patent is extended or adjusted under 35 U.S.C. 154(b) by 359 days.

(21) Appl. No.: 11/894,348

(22) Filed: Aug. 21, 2007

(65) Prior Publication Data

US 2009/0055427 A1    Feb. 26, 2009

(51) Int. Cl.
    *G06F 15/173* (2006.01)
(52) U.S. Cl. ........ 709/223; 709/224; 709/225; 709/226; 709/227
(58) Field of Classification Search ........... 709/223–227
    See application file for complete search history.

(56) References Cited

U.S. PATENT DOCUMENTS

| | | | |
|---|---|---|---|
| 7,031,967 B2 * | 4/2006 | Cheng et al. ................ | 707/10 |
| 7,325,019 B2 * | 1/2008 | Lam et al. ................ | 1/1 |
| 7,441,021 B1 * | 10/2008 | Perry ........................ | 709/223 |
| 2002/0026592 A1 * | 2/2002 | Gavrila et al. ............. | 713/201 |
| 2003/0051020 A1 * | 3/2003 | Kadam et al. .............. | 709/223 |
| 2004/0172634 A1 * | 9/2004 | Honda et al. ............... | 718/104 |
| 2005/0027846 A1 * | 2/2005 | Wolfe et al. ................ | 709/223 |
| 2005/0065994 A1 * | 3/2005 | Creamer et al. ............ | 709/202 |
| 2005/0086252 A1 * | 4/2005 | Jones et al. ................ | 707/102 |
| 2005/0171958 A9 * | 8/2005 | Cheng et al. ............... | 707/100 |
| 2006/0248522 A1 * | 11/2006 | Lakshminarayanan et al. .................... | 717/174 |
| 2008/0040455 A1 * | 2/2008 | MacLeod et al. .......... | 709/220 |

\* cited by examiner

*Primary Examiner* — Brian P Whipple
*Assistant Examiner* — Keyvan Emdadi
(74) *Attorney, Agent, or Firm* — Hitt Gaines, PC

(57) ABSTRACT

A method for creating a newly configured policy comprises a plurality of operations. An operation is performed for receiving a policy creation request including identification information corresponding to a template policy, override information corresponding to the template policy and override information corresponding to a policy referenced by the template policy. An operation is performed for facilitating cloning of a new referenced policy in accordance with the override information corresponding to the referenced policy. An operation is performed for assigning the new referenced policy to a configuration of the template policy. An operation is performed for facilitating cloning of a new policy in accordance with the override information corresponding to the template policy, the template policy configuration and the assigned new referenced policy.

17 Claims, 2 Drawing Sheets

CLONING POLICY USING TEMPLATES AND OVERRIDE CLONED POLICY

FIELD OF THE DISCLOSURE

The disclosures made herein relate generally to policies in network element functionality and capabilities relating to Service Aware Management (SAM) and, more particularly, to SAM capabilities for facilitating creation of policies.

BACKGROUND

In a network element, Self Aware Management (SAM) functionality relates to the capabilities of the management processes and the related infrastructure to organize themselves and operate in a fully or partially autonomous manner. Preferably, tasks of a network element administrator (i.e., a SAM operator) with regard to SAM functionality are limited to the defining operational objectives and parameters of these processes. These operational objectives and parameters must take into account the non-active nature (i.e., non-static nature) of the network elements being affected by the SAM functionality.

One significant limitation of known SAM functionality is that cloning (i.e., creating) a policy requires numerous manual steps need to be performed by the SAM operator. Put differently, known SAM functionality does not have the capability to deep clone an object and modify its attributes in a single transaction. Deep cloning refers to replication of policy elements that are deeply embedded within a respective policy. The known approaches for cloning a policy from another policy require an external system to perform several transactions. Examples of these transactions include, but are not limited to, cloning each child of a target object (one transaction per clone), modifying (i.e., overriding) one or more attributes (i.e., properties) of the cloned children (one transaction per modification), cloning a target object (one transaction per clone) and updating the cloned target object with cloned child as its child (i.e., one transaction per update). A policy (e.g., an SLA profile policy) is an example of a target object and a referenced policy is an example of a child object with respect to the policy.

Therefore, an approach for facilitating SAM functionality in a manner that provides for deep of a policy in a single transaction would be advantageous, desirable and useful.

SUMMARY OF THE DISCLOSURE

Embodiments of the present invention provide for facilitating SAM functionality in a manner that provides for deep cloning of a policy in a single transaction. More specifically, in a single transaction, embodiments of the present invention provide for cloning each referenced object of a referencing object, modifying one or more attributes of the cloned children, cloning a target object, and updating the cloned target object with cloned child as its child. An example of a benefit of such single transaction deep cloning is that cloning and modifying an object in one transaction dramatically improves performance of external systems accessing SAM via OSSI (Operations Support System Interface).

In one embodiment of the present invention, a method for creating a newly configured policy comprises a plurality of operations. An operation is performed for receiving a policy creation request including identification information corresponding to a template policy, override information corresponding to the template policy and override information corresponding to a policy referenced by the template policy. An operation is performed for facilitating cloning of a new referenced policy in accordance with the override information corresponding to the referenced policy. An operation is performed for assigning the new referenced policy to a configuration of the template policy. An operation is performed for facilitating cloning of a new policy in accordance with the override information corresponding to the template policy, the template policy configuration and the assigned new referenced policy.

In another embodiment of the present invention, a method for creating a newly configured SLA profile policy comprises a plurality of operations. Operations are performed for receiving a SLA profile policy creation request. The SLA profile policy creation request includes identification information corresponding to a template SLA profile policy, override information corresponding to the template SLA profile policy and override information corresponding to an existing policy referenced by the template SLA profile policy. After receiving the SLA profile policy creation request, operations are perform for creating a referenced policy override configuration corresponding to the referenced policy override information, retrieving the template SLA profile policy, creating a configuration corresponding to the template SLA profile policy and retrieving the existing referenced policy. In response to retrieving the existing referenced policy, operations are performed for creating a configuration corresponding to the existing referenced policy and for merging the referenced policy override configuration with the existing referenced policy configuration to create an altered referenced policy configuration that reflects the referenced policy override information. After creating the altered referenced policy configuration, an operation is performed for creating a new referenced policy in accordance with the altered referenced policy configuration. In response to creating the new referenced policy, an operation is performed for assigning the new referenced policy to the SLA profile policy configuration. An operation is performed for altering the template SLA profile policy configuration to reflect the template SLA profile policy override information for creating an altered template SLA profile policy configuration in response to assigning the new referenced policy to the SLA profile policy configuration, followed by an operation being performed for creating the new SLA profile policy in accordance with the altered template SLA profile policy configuration.

In another embodiment of the present invention, an apparatus configured for creating a newly configured policy comprises a plurality of processor-executable instructions. Processor-executable instructions are provided for receiving a policy creation request including identification information corresponding to a template policy, override information corresponding to the template policy and override information corresponding to a policy referenced by the template policy. Processor-executable instructions are provided for facilitating cloning of a new referenced policy in accordance with the override information corresponding to the referenced policy. Processor-executable instructions are provided for assigning the new referenced policy to a configuration of the template policy. Processor-executable instructions are provided for facilitating cloning of a new policy in accordance with the override information corresponding to the template policy, the template policy configuration and the assigned new referenced policy.

These and other objects, embodiments, advantages and/or distinctions of the present invention will become readily apparent upon further review of the following specification, associated drawings and appended claims.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals.

DETAILED DESCRIPTION OF THE DRAWING FIGURES

Embodiments of the present invention allow a new policy that contains one or more sub-policies to be created with minimum amount of overhead from an operator. Creating such new policies involves cloning a policy object and its referring policy objects within the policy. Implementations of the present invention involve specifying one or more base policies to be used for the new policy, along with any new values to be used. In the same transaction, modify properties of the cloned objects with provided override configuration. These new values are referred to herein as override information and the structure in which such override information is specified is referred to herein as an override configuration.

Figure 1:
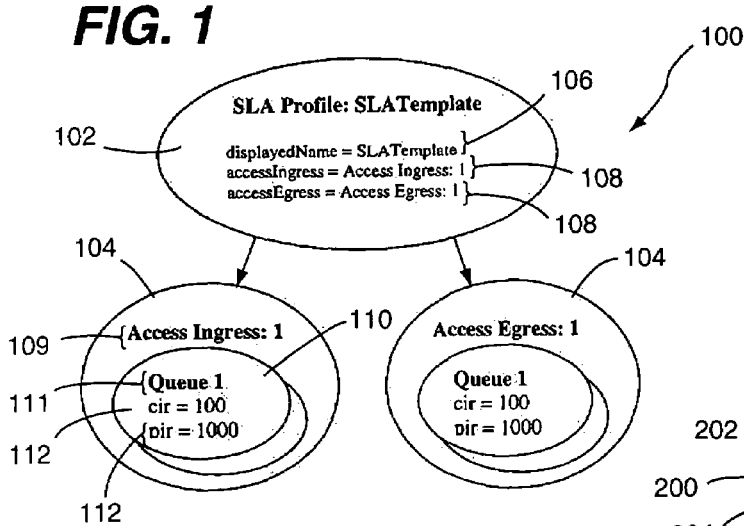
FIG. 1 shows an embodiment of a policy hierarchy in accordance with the present invention.

FIG. 1 shows an embodiment of a template policy hierarchy 100 in accordance with the present invention. The template policy hierarchy 100 includes a template policy 102 and one or more existing referenced polices 104. With respect to creating a newly configured policy in accordance with the present invention, the template policy 102 is a policy object being used in the cloning of another policy (i.e., the cloned profile policy) and each referenced policy 104 is a policy object being used in the cloning of another policy (i.e., the cloned referenced policy). The template policy 102 includes a template policy identifier 106 and one or more referenced template pointers 108. Each one of the referenced template pointers 108 designated a respective referenced policy (i.e., a respective one of the referenced policies 104) assigned to the template policy 102. The one or more existing referenced polices 104 are each associated with the template policy 102 and each include a respective referenced policy identifier 109. The one or more existing referenced polices 104 also each include a respective child entry 110, which each have a respective child entry identifier 111 and one or more child entry values 112. The specific configuration of such a policy hierarchy will be well known by a skilled person and, thus, will not be discussed herein in further detail.

Policies can be objects within SAM, which can be distributed network elements. Within SAM, Filter and Profile are sub-categories of a policy. There are several types of policies, such as Access Ingress and Access Egress policies, ACL Filters, SLA Profiles and the like. Queues are children of Access Ingress and/or Access Egress Policies. CIR and PIR are properties of Queues. Values 100 and 1000 are used to illustrate how these values are replaced with values in the override information, in the resulting cloned SLA object.

Figure 2:
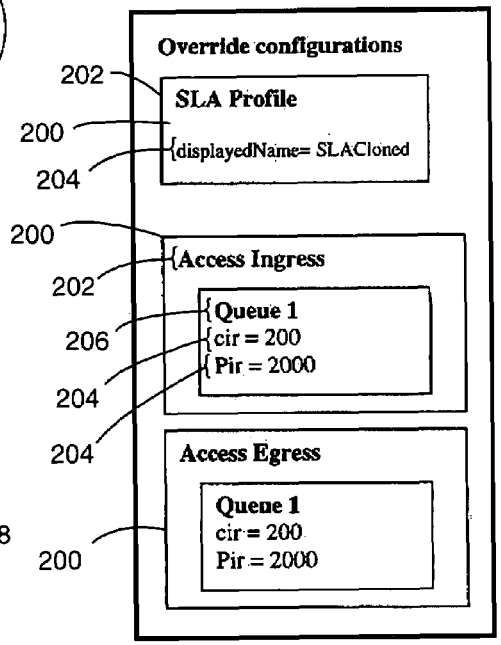
FIG. 2 shows an embodiment of override configurations in accordance with the present invention.

FIG. 2 shows an embodiment of override configurations 200 in accordance with the present invention. Each one of the override configurations 200 includes a configuration policy identifier 202 that corresponds to the template policy identifier of a respective template policy or to a referenced policy identifier of a respective referenced policy. Each one of the override configurations 200 also includes override information 204 corresponding to the respective policy. Examples of override information include, but are not limited to, a cloned policy identifier and a child entry value 112 for a cloned policy. In certain instances (e.g., an override configuration corresponding to a referenced policy), one or more of the override configurations 200 can include a respective child entry identifier 206.

Override information is passed as parameters of the SAM OSSI interface. SAM converts override information into a respective policy configuration (i.e., a configuration object for a policy) used for overriding corresponding components of a designated template policy. A configuration object is a serializable object used to configure a SAM entity such as, for example, an Access Ingress Policy, an Access Egress Policy, an ACL (Access Control List) IP (internet Protocol) Filter, a VPLS (Virtual Private LAN Service), etc. Every SAM entity has a corresponding configuration object, which is used by SAM clients to create, modify, and delete corresponding SAM entities.

A property that refers to another object (e.g., SAM object) is referred to herein as a mirrored property. The referenced template pointers 108 specify mirrored properties (i.e., Access Ingress: 1 and Access Egress: 1). The referenced object of a mirrored property is referred to herein as a mirrored object. Thus, in facilitating deep cloning in accordance with the present invention, a configuration object for each mirrored object referenced by mirrored properties in a designated template policy and that were provided with override configuration is obtained (e.g., retrieved) and is overridden with respective provided override configuration. Such an override configuration is referred to herein as a mirrored object configuration. Using the override mirrored object configuration, a corresponding new mirrored object is created. Then, the mirrored property of the override configuration of the template policy with the newly created mirrored object is updated. Once all mirrored objects having an override configuration associated are cloned, the configuration of the template policy is obtained and is overridden with a respective template override configuration, followed by proceeding with creating the policy object with the new configuration.

Figure 3:
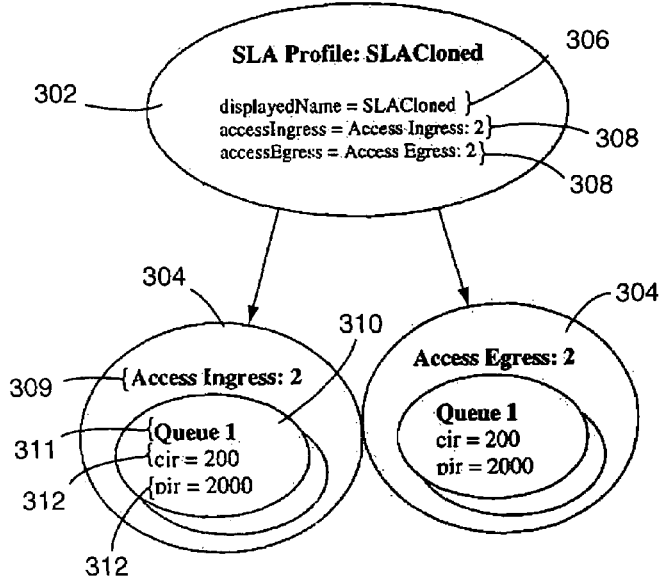
FIG. 3 shows an embodiment of a cloned policy hierarchy corresponding to the policy hierarchy of FIG. 1 and the override configurations 200 of FIG. 2.

FIG. 3 shows an embodiment of a cloned policy hierarchy 300 corresponding to the policy hierarchy of FIG. 1 and the override configurations 200 of FIG. 2. More specifically, the cloned policy hierarchy 300 is a policy hierarchy created by deep cloning the template policy hierarchy 100 of FIG. 1 in accordance with the override configurations 200 of FIG. 2. The cloned policy hierarchy 300 includes a cloned policy 302 and one or more cloned referenced polices 304. The cloned policy 302 includes a cloned policy identifier 306 and one or more referenced template pointers 308. Each one of the referenced template pointers 308 designated a respective referenced policy (i.e., a respective one of the referenced policies 304) assigned to the template policy 302. The one or more cloned referenced polices 304 are each associated with the cloned policy 302 and each include a respective referenced policy identifier 309. The one or more cloned referenced polices 304 also each include a respective child entry 310, which each have a respective child entry identifier 311 and one or more child entry values 312.

Figure 4:
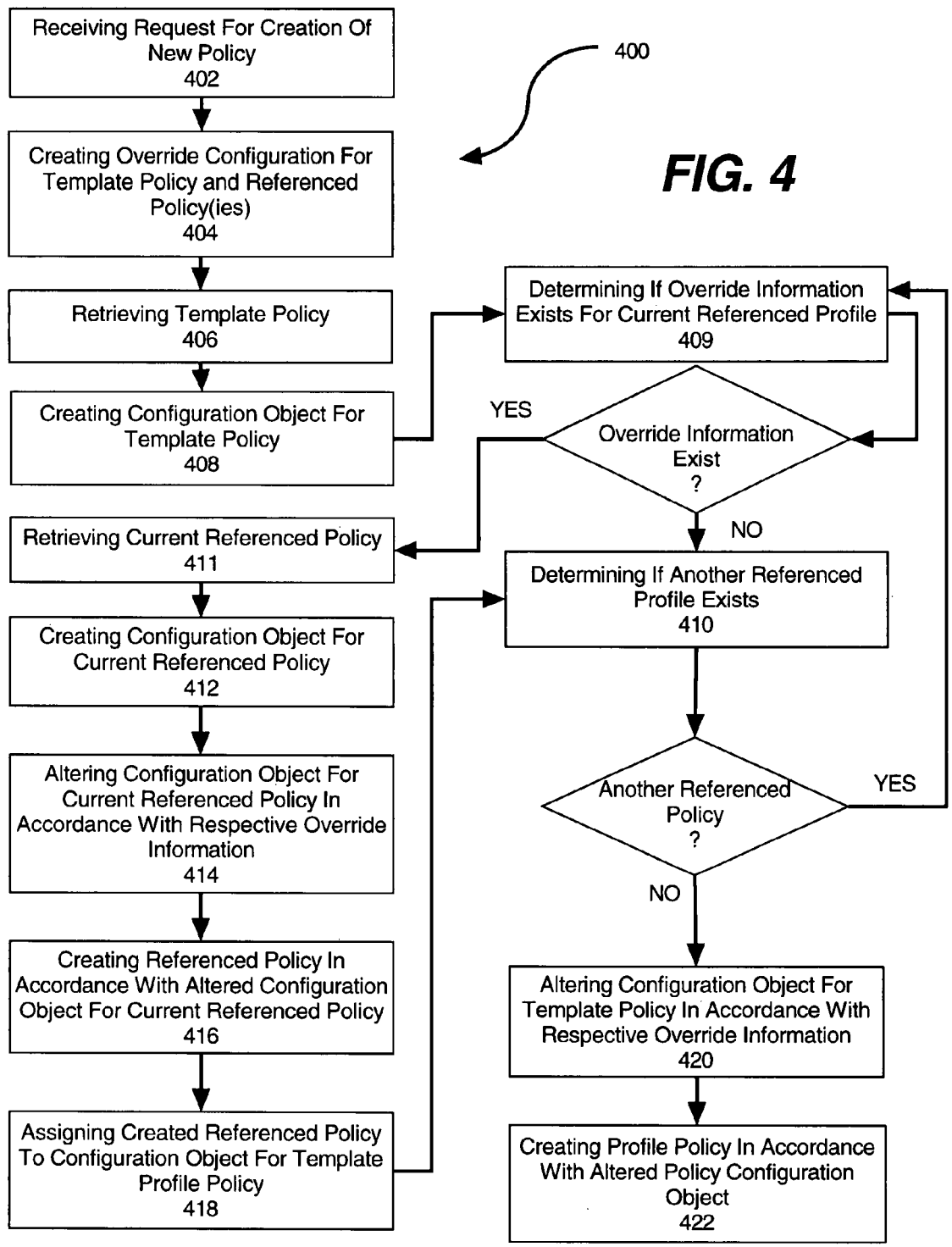
FIG. 4 shows an embodiment of a method for creating a newly configured policy in accordance with the present invention.

FIG. 4 shows an embodiment of a method 400 for creating a newly configured policy in accordance with the present invention. In one example, the method 400 is carried out for facilitating creation of the cloned policy 302 in FIG. 3 from template policy 102 in FIG. 1 using the override configurations 200 in FIG. 2. Accordingly, the method 400 is configured for facilitating deep cloning of policies, which is advantageous for the aforementioned reasons.

The method 400 starts with an operation 402 for receiving a new policy creation request. The new policy creation request includes identification information corresponding to a template profile, override information corresponding to the template policy and override information corresponding to an existing policy referenced by the template policy. A SLA profile policy is an example of a template policy in accordance with the present invention.

In response to receiving the new policy creation request, an operation 404 is performed for creating a referenced policy override configuration corresponding to template policy and referenced policy override information, followed by an operation 406 being performed for retrieving the template policy. Processing deep policy override information is defined herein to include creating the referenced policy override configuration for the referenced policies. In response to retrieving the template policy, an operation 408 is performed for creating a configuration (i.e., a template policy configuration object) corresponding to the template policy. During or after creation of the template policy configuration, an operation 409 is performed for determining if an override configuration exists for a current referenced policy. In the first instance of performing operation 409, the current referenced policy is the first referenced policy. In response to determining that an override configuration does exist for the current referenced policy, an operation 411 is performed for retrieving the existing referenced policy (i.e., the current reference policy), followed by an operation 412 being performed for creating a configuration corresponding to the existing referenced policy (i.e., a referenced policy configuration object). Thereafter, an operation 414 is performed for merging the referenced policy override configuration with the existing referenced policy configuration to create an altered referenced policy configuration that reflects the referenced policy override information. After creating the altered referenced policy configuration, an operation 416 is performed for creating a new referenced policy (i.e., cloned reference policy) in accordance with the altered referenced policy configuration, followed by an operation 418 being performed for assigning the new referenced policy to the template policy configuration.

Facilitating deep cloning in accordance with the present invention includes operations 404 and 410-418. The current referenced policy is that policy that is currently being cloned. The override configurations may include override information for one or more other referenced policies. In such instances, the operations 410-418 are repeated in a sequential or parallel manner for each one of the other referenced policies designated in the override configurations. Thus, each one of the designated referenced policies is sequentially cloned in accordance with the respective override information.

Returning to the operation 409 for determining if an override configuration exists for a current referenced policy, if it is determined that an override configuration does not exist for the current referenced policy, an operation 419 is performed for determining if another referenced policy exists. If a next referenced policy exists, the method proceeds at the operation 409 in view of the next (i.e., now current referenced policy). If it is determined that a next referenced policy does not exists, an operation 420 is performed for altering the template SLA profile policy configuration to reflect the template policy override information for creating an altered template policy configuration. In response to creating the altered template policy configuration, an operation 422 is performed for creating a new policy (e.g., SLA profile policy) in accordance with the altered template policy configuration.

For each mirrored object referenced by mirrored properties in the template policy that were provided with override configuration, obtain configuration object and override it with the provided override configuration. Using the new mirrored object configuration create a new mirrored object. Then update the mirrored property of the override configuration of the template policy with the newly created mirrored object. Once all the mirrored objects are cloned, obtain the configuration of the template policy and override it with the template override configuration. Then proceed to create the policy object with the new configuration.

Referring now to computer-executable instructions in accordance with the present invention, it will be understood from the disclosures made herein that methods, processes and/or operations configured for facilitating policy cloning functionality as disclosed herein are tangibly embodied by computer readable medium having instructions thereon that are configured for carrying out such functionality. In one specific embodiment, the instructions are tangibly embodied for carrying out policy cloning functionality as disclosed in reference to FIGS. 1-4. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the present invention include a compact disk, a hard drive, RAM or other type of storage apparatus that has imaged thereon instructions (e.g., a computer program) adapted for facilitating policy cloning functionality in accordance with the present invention.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for creating a newly configured policy, comprising:
receiving a policy creation request including identification information corresponding to a template policy, override information corresponding to the template policy and override information corresponding to a policy referenced by the template policy, wherein said referenced policy is an existing policy having a plurality of policy entry values specified therein;

facilitating cloning of a new referenced policy in accordance with said override information corresponding to said referenced policy;

assigning the new referenced policy to a configuration of the template policy; and facilitating cloning of a new policy in accordance with said override information corresponding to the template policy, said template policy configuration and said assigned new referenced policy, wherein facilitating said cloning of the new policy includes altering at least one of said policy entry values in accordance with said override information.

2. The method of claim 1:

wherein facilitating cloning of the new referenced policy includes creating an override configuration corresponding to said referenced policy override information and creating the new referenced policy in accordance with the override configuration;

wherein a property that refers to another object is a mirrored property;

wherein a referenced template pointer specifies a mirrored property;

wherein a referenced object of a mirrored property is a mirrored object and wherein cloning of the template policy into the new policy and the referenced policy into the new referenced policy occurs in a single transaction;

wherein an override configuration relating to a mirrored object is a mirrored object configuration; and further comprising:

overriding with said override configuration a configuration object for each mirrored object referenced by the mirrored property in the template policy and that was provided with override configuration in accordance with said override information;

creating a new mirrored object using the mirrored object configuration;

updating the mirrored property of the override configuration of the template policy with the new mirrored object; and after the mirrored object having override configuration associated therewith is cloned, overriding a configuration of the template policy with a respective template override configuration derived from said override information.

3. The method of claim 2 wherein:

facilitating cloning of the new policy includes retrieving the template policy; and creating said referenced policy override configuration is performed prior to retrieving the template policy.

4. The method of claim 3 wherein said referenced policy override information includes values for at least one child entry of said referenced policy.

5. The method of claim 2 wherein:

said referenced policy override information includes values for at least one child entry of said referenced policy.

6. The method of claim 2 wherein:

creating the new policy includes retrieving the template policy, creating said template policy configuration; altering said template policy configuration in accordance with said template policy override information, and cloning the new policy in accordance with said altered template policy configuration; and said referenced policy override configuration is created prior to retrieving the template policy in response to receiving the policy creation request.

7. The method of claim 6 wherein said referenced policy override information includes values for at least one child entry of said referenced policy.

8. A method for creating a newly configured profile policy, comprising:

receiving a profile policy creation request including identification information corresponding to a template profile policy, override information corresponding to the template profile policy and override information corresponding to an existing policy referenced by the template profile policy, wherein the existing policy has a plurality of policy entry values specified therein;

creating a referenced policy override configuration corresponding to said referenced policy override information;

retrieving the template profile policy;

creating a configuration corresponding to the template profile policy;

retrieving said existing referenced policy;

creating a configuration corresponding to said existing referenced policy;

merging the referenced policy override configuration with said existing referenced policy configuration to create an altered referenced policy configuration that reflects said referenced policy override information;

creating a new referenced policy in accordance with the altered referenced policy configuration;

assigning the new referenced policy to said profile policy configuration altering said template profile policy configuration to reflect said template profile policy override information for creating an altered template profile policy configuration; and creating the new profile policy in accordance with the altered template profile policy configuration, wherein creating the new profile policy includes altering at least one of said policy entry values in accordance with said override information.

9. The method of claim 8 wherein said referenced policy override information includes values for at least one child entry of said referenced policy.

10. The method of claim 8 wherein creating the referenced policy override configuration is performed prior to retrieving the template profile policy.

11. An apparatus configured for creating a newly configured policy, comprising:

processor-executable instructions for receiving a policy creation request including identification information corresponding to a template policy, override information corresponding to said the template policy and override information corresponding to a policy referenced by the template policy, wherein said referenced policy is an existing policy having a plurality of policy entry values specified therein:

processor-executable instructions for facilitating cloning of a new referenced policy in accordance with said override information corresponding to said reference policy;

processor-executable instructions for assigning the new referenced policy to a configuration of the template policy; and processor-executable instructions for facilitating cloning of a new policy in accordance with said override information corresponding to the template policy, said template policy configuration and said assigned new referenced policy, wherein facilitating said cloning of the new policy includes altering at least one of said policy entry values in accordance with said override information, wherein each of said processor-executable instructions for receiving, for facilitating cloning of a new referenced policy, for assigning and for facilitating cloning of a new policy are tangibly embodied on a non-transitory computer readable medium.

12. The apparatus of claim 11:
wherein facilitating cloning of the new referenced policy includes creating an override configuration corresponding to said referenced policy override information and creating the new referenced policy in accordance with the override configuration;
wherein a property that refers to another object is a mirrored property;
wherein a referenced template pointer specifies a mirrored property;
wherein a referenced object of a mirrored property is a mirrored object;
wherein an override configuration relating to a mirrored object is a mirrored object configuration; and further comprising:
   overriding with said override configuration a configuration object for each mirrored object referenced by the mirrored property in the template policy and that was provided with override configuration in accordance with said override information;
   creating a new mirrored object using the mirrored object configuration;
   updating the mirrored property of the override configuration of the template policy with the new mirrored object; and
   after the mirrored object having override configuration associated therewith is cloned, overriding a configuration of the template policy with a respective template override configuration derived from said override information.

13. The apparatus of claim 12 wherein:
facilitating cloning of the new policy includes retrieving the template policy; and
creating said referenced policy override configuration is performed prior to retrieving the template policy.

14. The apparatus of claim 13 wherein said referenced policy override information includes values for at least one child entry of said referenced policy.

15. The apparatus of claim 12 wherein said referenced policy override information includes values for at least one child entry of said referenced policy.

16. The apparatus of claim 12 wherein:
creating the new policy includes retrieving the template policy, creating said template policy configuration; altering said template policy configuration in accordance with said template policy override information, and cloning the new policy in accordance with said altered template policy configuration; and
said referenced policy override configuration is created prior to retrieving the template policy in response to receiving the policy creation request.

17. The apparatus of claim 16 wherein said referenced policy override information includes values for at least one child entry of said referenced policy.

* * * * *